US008954311B2

(12) United States Patent
Gupta et al.

(10) Patent No.: US 8,954,311 B2
(45) Date of Patent: Feb. 10, 2015

(54) ARRANGEMENTS FOR EXTENDING CONFIGURATION MANAGEMENT IN LARGE IT ENVIRONMENTS TO TRACK CHANGES PROACTIVELY

(75) Inventors: Manish Gupta, New Delhi (IN); Venkateswara R. Madduri, New Delhi (IN); Manoj Soni, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 13/222,356

(22) Filed: Aug. 31, 2011

(65) Prior Publication Data

US 2013/0054220 A1 Feb. 28, 2013

(51) Int. Cl.
*G06F 9/45* (2006.01)
*G06F 11/30* (2006.01)
*G06F 11/00* (2006.01)
*G06F 9/445* (2006.01)

(52) U.S. Cl.
CPC ........ *G06F 11/3006* (2013.01); *G06F 11/3051* (2013.01); *G06F 11/008* (2013.01); *G06F 9/44505* (2013.01)
USPC ......................................................... 703/22

(58) Field of Classification Search
CPC . G06F 9/44505; G06F 11/30; G06F 11/3006; G06F 11/3051
USPC ......................................... 707/691; 717/121
See application file for complete search history.

(56) References Cited

U.S. PATENT DOCUMENTS

| | | | |
|---|---|---|---|
| 7,131,031 B2 | 10/2006 | Brundridge et al. | |
| 7,177,267 B2* | 2/2007 | Oliver et al. | 370/216 |
| 7,539,907 B1 | 5/2009 | Johnsen et al. | |
| 7,756,828 B2* | 7/2010 | Baron et al. | 707/634 |
| 2007/0100712 A1* | 5/2007 | Kilpatrick et al. | 705/29 |
| 2007/0288280 A1* | 12/2007 | Gilbert et al. | 705/8 |
| 2008/0126439 A1* | 5/2008 | Kaminsky | 707/203 |
| 2008/0244611 A1* | 10/2008 | Doyle et al. | 718/105 |
| 2008/0263084 A1* | 10/2008 | Faihe et al. | 707/103 R |
| 2009/0066528 A1 | 3/2009 | Bickel et al. | |
| 2013/0046739 A1* | 2/2013 | Waschke et al. | 707/691 |

OTHER PUBLICATIONS

Gupta et al. ("Determining Configuration Parameter Dependencies via Analysis of Configuration Data from Multi-tiered Enterprise Applications", ICAC'09, Jun. 15-19, 2009, pp. 169-178).*
Boris Gruschke ("Integrated Event management: Event correlation using dependency graphs", DSOM, 1998, pp. 1-12).*
Madduri et al. (A configuration management database architecture in support of IBM Service Management, IBM Systems Journal, vol. 46, No. 3, 2007, pp. 441-457).*
Brown et al. (An Active Approach to Characterizing Dynamic Dependencies for Problem Determination in a Distributed Environment, IEEE, 2001, pp. 377-390).*
Aggarawal, B., et al., "NetPrints: Diagnosing Home Network Misconfigurations Using Shared Knowledge", Technical Paper, available at http://www.usenix.org/event/nsdi09/tech/full_papers/aggarwal/aggarwal_html/ as of Aug. 12, 2011.
White, D., et al., "Automated Diagnosis of Product-line Configuration Errors in Feature Models", Software Product Line Conference, 2008, SLPC'08, 12th International Conference, Sep. 8-12, 2008, pp. 225-234, IEEE, Limerick, Ireland.

* cited by examiner

*Primary Examiner* — Omar Fernandez Rivas
*Assistant Examiner* — Iftekhar Khan
(74) *Attorney, Agent, or Firm* — Ference & Associates LLC

(57) ABSTRACT

Methods and arrangements for tracking changes in an information technology environment. Configuration dependencies are learned in a production environment, and a model of the production environment is built. Events on a target system in the production environment are subscribed to. Events are received and correlated with the model to generate an enhanced model, and the enhanced model is thereupon employed to predict configuration errors.

25 Claims, 5 Drawing Sheets

ARRANGEMENTS FOR EXTENDING CONFIGURATION MANAGEMENT IN LARGE IT ENVIRONMENTS TO TRACK CHANGES PROACTIVELY

BACKGROUND

Generally, configuration management is the process of detailed recording and updating of an enterprise's IT (information technology) infrastructure. A common conventional practice is to maintain the hardware and software configuration information of the IT resources in a central database, often referred to as a Configuration Management Database (CMDB). When the CMDB is setup correctly, it stores configuration and relational information about defined entities which are part of the information system. These entities are called Configuration Items (CI).

Often, there is found a Common Information Model (CIM), which is a high level abstraction of the participating entities that are used to capture the status of the entities and their interactions. In order to be useful, the CMDB should accurately reflect the states of the entities. However, in a large enterprise with thousands of entities it is often difficult to scale the tools efficiently to track changes in an agile manner.

Several factors contribute to an inability to maintain a consistent view of changes. Conventional discovery tools that work in a scan-and-gather mode are configured to perform a sweep of systems periodically. However, the polling interval involved cannot be decreased to update changes more quickly, as this can significantly increase overhead. The entire scan sweep of a large IT environment may itself take several hours, thereby inviting a measure inconsistency. Further, while many enterprises can and do enforce a policy of allowing only planned changes, thereby making it easy to track a change in a systematic manner, there still often emerge scenarios where an out-of-band change is unavoidable in a critical situation. Such changes (e.g., install, a patch, reset a password, security compliance enforcement) are executed using stand-alone scripts or directly through product GUIs (graphical user interfaces). Thus, an out-of-band change can put a system in a different state without creating a record of the change apriori.

In addition to the aforementioned factors that make it difficult to maintain a consistent view of a single entity, software dependencies can also prove problematic. Particularly, changes to one software entity may affect several other dependent entities, thereby creating a ripple of inconsistencies.

BRIEF SUMMARY

In summary, one aspect of the invention provides a method comprising: learning configuration dependencies in a production environment; building a model of the production environment; subscribing to events on a target system in the production environment; and receiving events and correlating the events with the model to generate an enhanced model, and thereupon employing the enhanced model to predict configuration errors.

Another aspect of the invention provides an apparatus comprising: at least one processor; and a computer readable storage medium having computer readable program code embodied therewith and executable by the at least one processor, the computer readable program code comprising: computer readable program code configured to learn configuration dependencies in a production environment; computer readable program code configured to build a model of the production environment; computer readable program code configured to subscribe to events on a target system in the production environment; and computer readable program code configured to receive events and correlate the events with the model to generate an enhanced model, and thereupon employ the enhanced model to predict configuration errors.

An additional aspect of the invention provides a computer program product comprising: a computer readable storage medium having computer readable program code embodied therewith, the computer readable program code comprising: computer readable program code configured to learn configuration dependencies in a production environment; computer readable program code configured to build a model of the production environment; computer readable program code configured to subscribe to events on a target system in the production environment; and computer readable program code configured to receive events and correlate the events with the model to generate an enhanced model, and thereupon employ the enhanced model to predict configuration errors.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
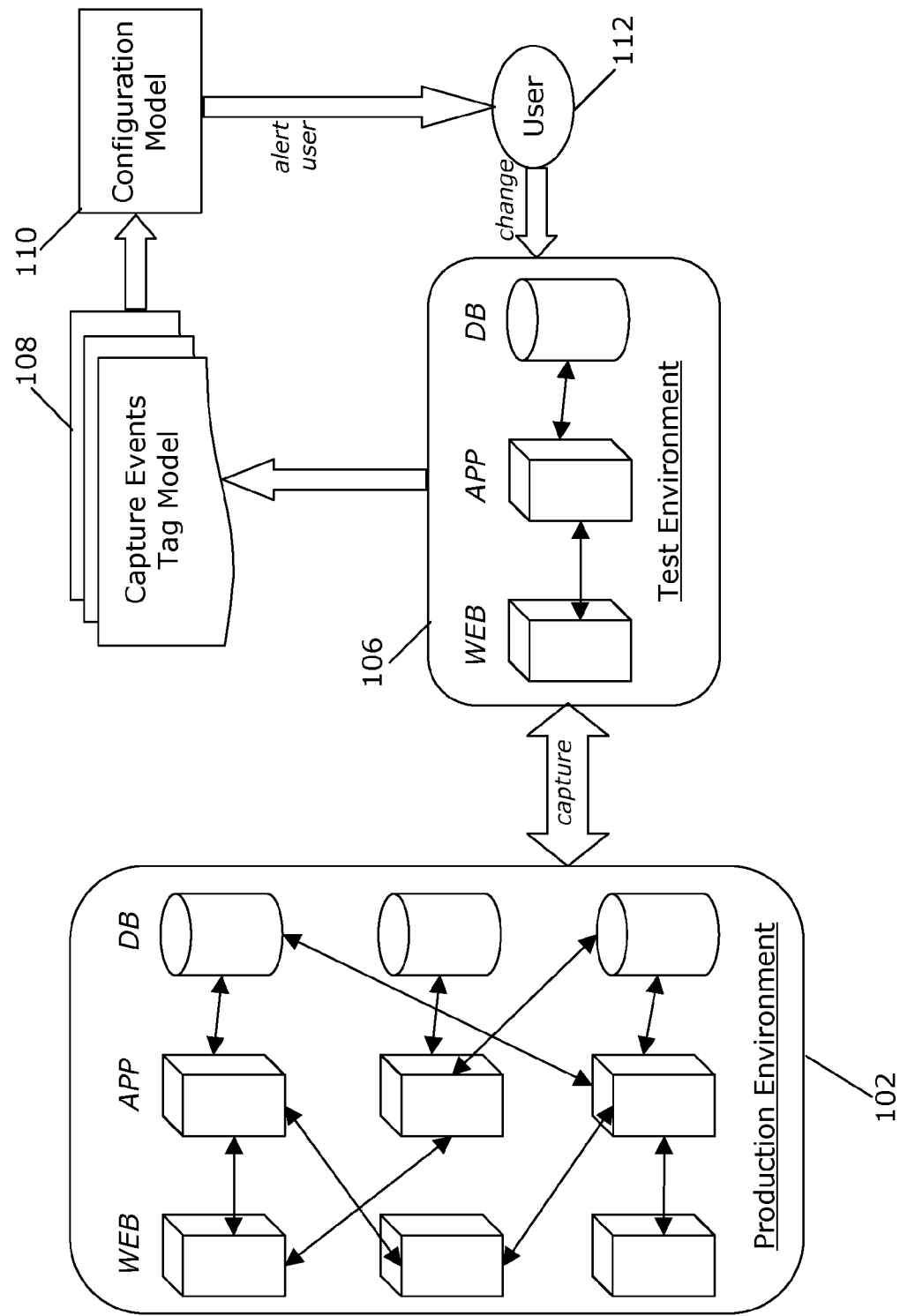
FIG. 1 schematically illustrates a system overview, with a test environment being used to capture complex production environments and learn tags for a model.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art will recognize, however, that the various embodiments of the invention can be practiced without at least one of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
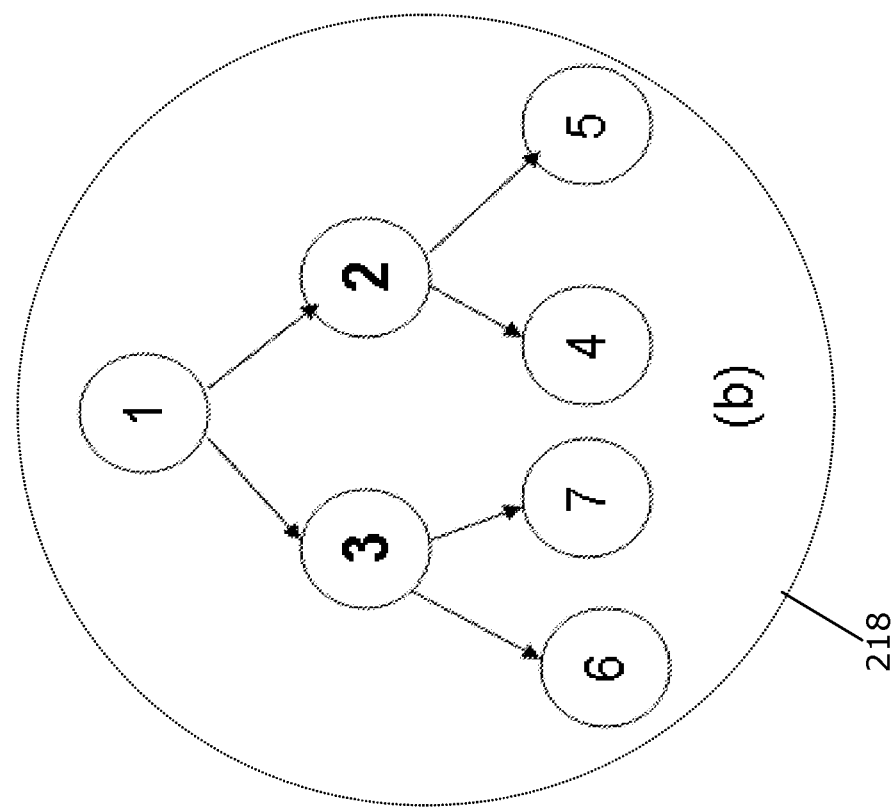
FIG. 2 schematically illustrates two isomorphic graphs.
Figure 2:
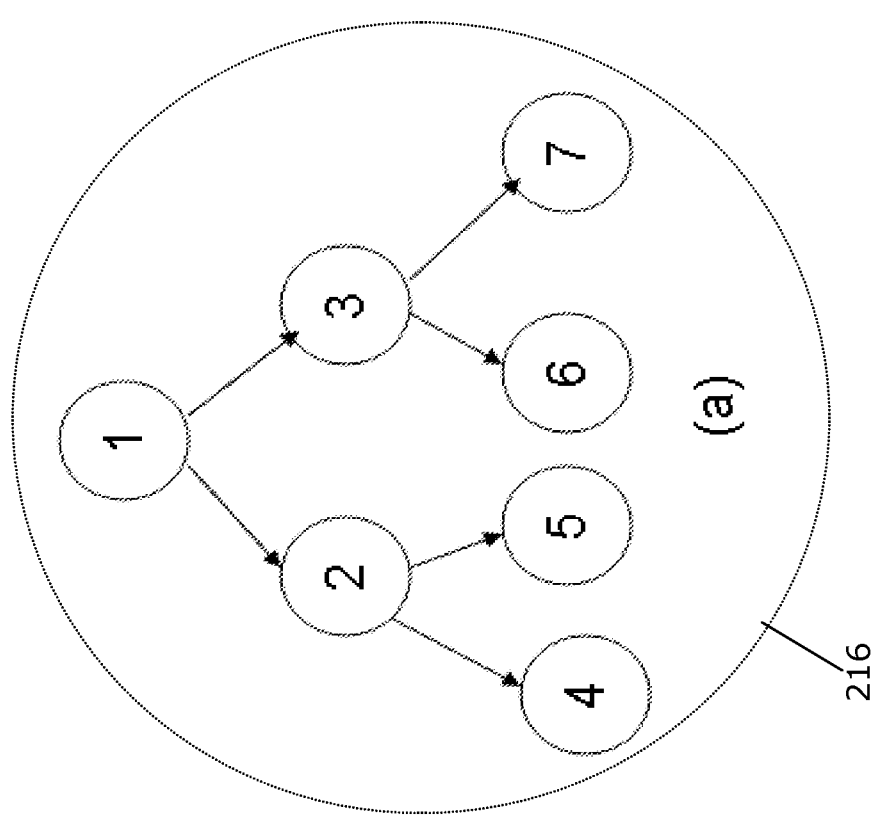
Figure 3:
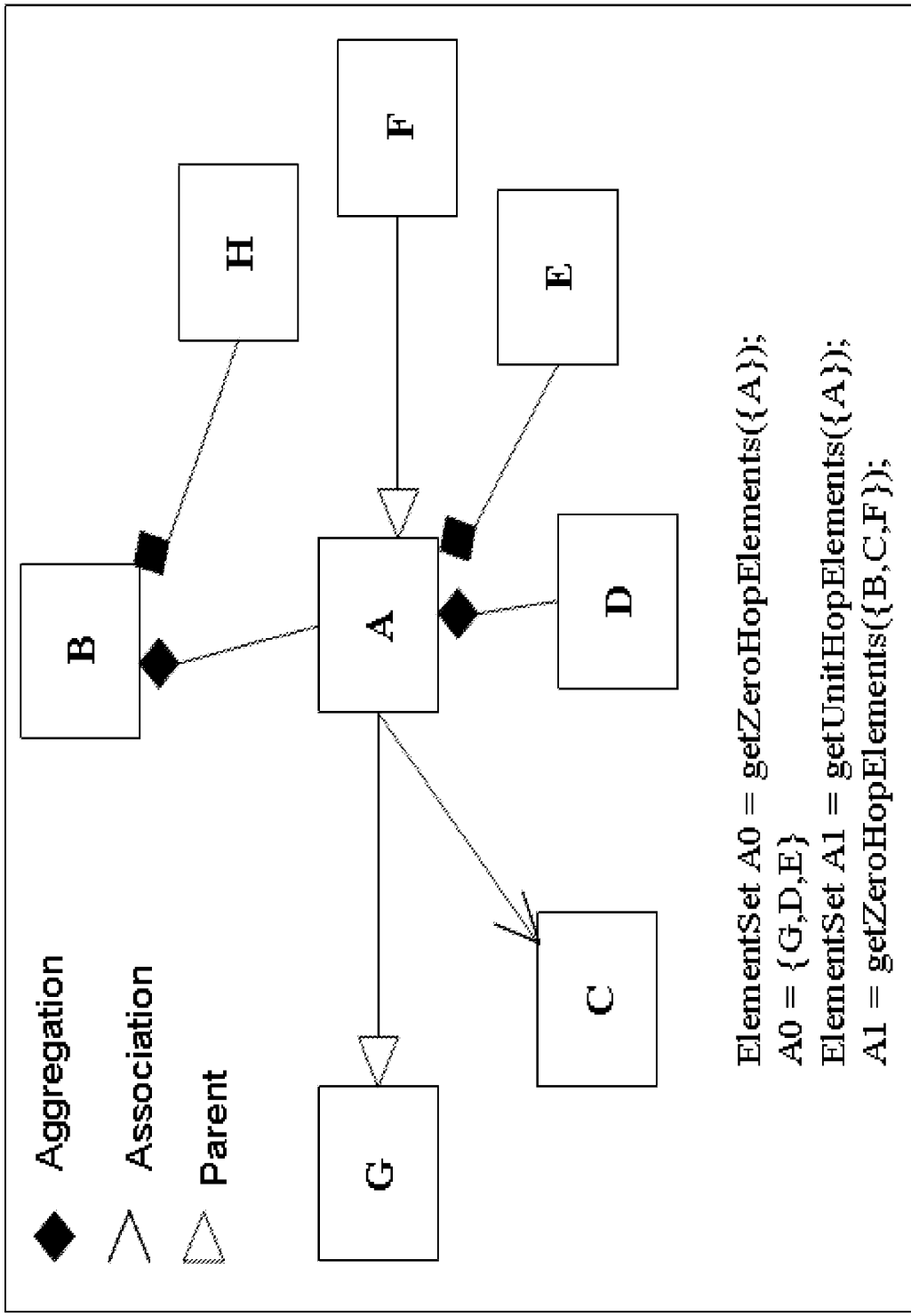
FIG. 3 schematically illustrates a UML representation.

The disclosure now turns to FIGS. 1-3. It should be appreciated that the processes, arrangements and products broadly illustrated therein can be carried out on or in accordance with essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 5 whether on a server computer, a client computer, a node computer in a distributed network, or any combination thereof.

Broadly contemplated herein, in accordance with at least one embodiment of the invention, are techniques for quickly detecting a change in an entity, as well as associated changes in corresponding dependent entities. This can help in updating a CMDB without waiting for the next scan of a discovery tool. In other words, proposed herein are methods that can augment pull-based discovery techniques by alerting a system of the immediate changes. The same information can also be used for triggering alerts for the administrator when a change is affecting dependent entities.

In accordance with at least one embodiment of the invention, methods as broadly contemplated herein stem from a principle that most changes in a system will generate a system event, such as a file system modify event when a password is modified in a system. The configuration model is enhanced by tagging appropriate portions of the model with different events. When respective events are triggered, it is easy to zoom into parts of the model that may have been affected, track the change locally, and push an update to the central database. Moreover, if the affected part of the model has a relationship to other entities, the latter can also be checked for changes, or for possible breakdown due to the change.

In accordance with at least one embodiment of the invention, it can be recognized that in order to build a reliable mapping of events to a model, it is desirable to execute some configuration changes on the systems. However, production environments often do not allow any access to change its configuration for experimentation. In order to circumvent this problem, there is broadly contemplated herein the use of a test environment that closely mimics the production environment in terms of setup. As the test environment is subjected to different changes, it is possible to learn the set of attributes or events to be associated with different parts of the model representing the production setup. Since configuration models are represented as graphs, there are broadly contemplated herein techniques for matching configuration graphs to detect changes.

In accordance with at least one embodiment of the invention, there are broadly contemplated herein methods and arrangements for enhancing conventional discovery tools by introducing a push based component that can detect changes in a system, attach the change to specific portions of the model, and thereupon bring the CMDB to a consistent state quickly. By discovering relationships across components in an IT (information technology) environment, it becomes possible to be alert to potential inconsistencies when a connected part of a system undergoes change, and this in turn allows for better-informed change execution on the part of an administrator who might present minimal domain expertise.

Generally, in accordance with at least one embodiment of the invention, it can be appreciated that essentially any IT environment will be characterized by a Configuration Model (CM), which captures the different hardware and software components present in the system. Production environments are usually complex setups with several client driven restrictions and resource constraints in terms of accessing these systems. Therefore, it can be important to replicate the key components of the production environment in a test environment, without losing the key relationship structure.

In accordance with at least one embodiment of the invention, FIG. 1 schematically illustrates a system overview showing how a test environment can be used to capture complex production environments and learn the tags for a model. Particularly, FIG. 1 shows how a simple test environment 106 can capture complex three-tier software architecture present in the production environment 102. The test environment 106 will also be characterized by a CM, which will be a subset of the production CM, but will have all the key entities. For instance, an element describing the database port in CM model will be the "bind address" which will be present for both the test (106) and production environment (102). It can be appreciated from FIG. 1 and from the discussion herein that, generally, a complex production environment can be represented in a simplified test environment by maintaining same entities and relationships.

In accordance with at least one embodiment of the invention, it is important to note that a setup has two representations: meta-model and model. A meta-model, as employed herein, can be considered to capture existing types and relationships, like a computer system, web application, without detailing out the exact values associated with it; thus, a meta-model is an abstraction of the entire setup without going into instance specific details. On the other hand, a model, as employed herein, can be considered to be an instance of a meta-model. For example, there may be multiple web application instances in a setup. A model instantiates each web application with specific values for bind-address and IP address, unlike the meta-model, which will only have a single abstract element without distinct values for the parameters.

In accordance with at least one embodiment of the invention, the CM is extended with one additional entity type, and two new relationships among the entities. The new entity is termed herein an "Event" type which captures a system event, like a file modification. On the other hand, one new relationship to consider is an "Affects" relation between the Event type and existing entities in a CM. Particularly, the Affects relationship denotes that a specific system event may be modifying a model entity. The other new relationship considered herein is the "SameAs" relation, which presents itself between two existing model entities. This is used to correlate two entities in the model which are part of same or different software applications. The "SameAs" relation is helpful in tracing dependencies across software applications.

In accordance with at least one embodiment of the invention, the "Event" type denotes any entity in the physical system, e.g., a file which holds the bind address of the database server. Accordingly, if such a file is modified, then an event is generated. The event can include a path (e.g., file path) and a machine IP address, whereupon several events are attached to existing elements in the CM. If any of the events is triggered, then the attendant implication is that there is a possible change in the element to which the event is attached to. This relationship can now be defined as "Affects", as touched on herein.

As such, in accordance with at least one embodiment of the invention, an event can be considered to have an "Affects" relationship with an entity when the generation of the event may change the value of an attribute in a CM entity. Consequently, an "Affects" relationship is characterized by two attributes: AffectedAttribute, and AffectsWeight. AffectedAttribute denotes the exact attributes in the CM entity whose value might be changing, such as a port number. AffectsWeight denotes the probability of this "event" affecting the attribute. Thus, the unadorned (or "vanilla", or unadulterated) CM entities now may be connected to "Events". These are the events which can potentially change the entity, and the type of the change is captured in "AffectedAttribute" and "AffectsWeight" fields.

In accordance with at least one embodiment of the invention, when one tier in an n-tier application undergoes some change, it is possible that it affects part of the other tiers that are connected to it. For example, modification to the DB (database) tier in a 3-tier application can trigger modification in the Web and App (application) tier. In this context, the CM model is extended with another relationship, "SameAs". The SameAs relation exists between two model entities that belong to different tiers of the application. It is characterized by three attributes: independent-attribute, dependent-attribute and SameAsWeight. "Dependent-attribute" denotes the element that should remain same between the field values of the independent-attribute. By way of an illustrative and non-restrictive example, in App server and DB server, the binding port should have the same value. Therefore, "independent-attribute" will represent the port-number attribute on the DB server, and the dependent attribute will represent the corresponding port-number attribute in the App server. If the value is modified in the DB server, the App server should also be checked for the correct value. The SameAsWeight is used to designate the importance of the connectivity while inferring whether it is a connected change; a process of determining SameAsWeight is discussed in more detail further below.

In accordance with at least one embodiment of the invention, and as shown in FIG. 1, the block denoted by "Capture Events, Tag Model" (108) subsumes the implementation of the Event capture framework and marking of the relationships in the configuration model 110. In order to collect the set of events in a system, an agent is executed to track all the system level changes, such as any file system modification, network event, etc. The collection of these events forms an "Events" entity set in the Configuration Model 110. Further, an entity in the CM 110 subscribes to a set of these events and is connected by a "Affects" relationship. The granularity at which an event can be captured depends on the setup, and the degree of computation allowed. For example, it is easier and less resource-intensive to track a directory level modification than a file level modification. However, if a directory level modification defines an event then any file modification within the directory will trigger a potential alert to check for a change in the CM entity.

In accordance with at least one embodiment of the invention, the scope of a system is at the level of virtual appliance (VA), wherein virtual appliances represent a network of virtual machines pre-installed and pre-configured with complex stacks of software. For each VA, relationships are learned by deploying in a test environment, with the learned knowledge then being used in a production environment deployed from same virtual appliances.

In accordance with at least one embodiment of the invention, in order to extend a configuration model 110 of a deployment in a test environment 106, there is introduced a special case of a graph isomorphism problem. As such, each vertex in the graph is tagged with at least one <attribute, value> pair. When solving the graph isomorphism, it is ensured that the attribute-value pair is also a match. For example, FIG. 2 shows two isomorphic graphs (216 and 218; alternatively labeled as "a" and "b", respectively), if only the vertex and edges are considered. However, when vertex weights (denoted inside each node) are considered, then the graphs are not isomorphic. The problem of interest, then, is given a specific node in 216 (e.g., the node with weight 2), there is a need to find which node in graph 218 is a match. Accordingly, in searching for the match, vertex weights need to be taken into consideration. Also, it is assumed that there can be more than one vertex in graph 218 which can match the specified vertex in graph 216, if only the node weights are directly matched.

Accordingly, in accordance with at least one embodiment of the invention, there is now illustrated a technique for finding a close match between two graphs, where every vertex has at least one <attribute, value> pair. The difficulty of the matching problem lies in the fact that there can be multiple vertices that may match the source vertex's attribute-value pair. Therefore, there is a need to distinguish among the candidate matching set while matching with the source vertex. The key intuition behind the method is to search the connected elements for the candidate nodes from the two graphs, and assign a weight to mark the degree of match. A higher weight indicates higher degree of match between the source vertex and the chosen vertex of the candidate set.

In accordance with at least one embodiment of the invention, the method, referred to as the Neighborhood Closeness Algorithm (NCA) henceforth, relies on the accurate computation of the weight in order to distinguish among the elements in the candidate set. Weight is calculated to describe closeness between two elements (entities) based on attribute values as zero if there is no attribute with common value in both elements. Otherwise, "weight" represents the number of attributes with identical values divided by smaller of total number of attributes in both elements. As such, weight can be defined to describe closeness between two element sets as follows. For each element in first element set, weight is calculated as a sum of nonzero weights obtained by calculating weight with every element in second element set divided by count of elements in second element set where a nonzero weight was obtained. These nonzero weights are then added for each element in the first element set, with this total then divided by the total number of elements in first element set where a nonzero weight was obtained.

In accordance with at least one embodiment of the invention, since models are generally represented using UML (unified modeling language), it will now be shown how to transform a UML representation into a standard graph representation. In FIG. 3, which schematically illustrates a UML representation 320, at element A there are considered related elements based on relation types. Relation types can be aggregation, association, or parent. To find set of relevant elements for element A, there is considered its parent element, {G} and elements which are aggregated at A, i.e, {D, E}. This {D, E} set represents the set of relevant elements at zero-hop distance for element A in the UML model 320. To find relevant elements at 1-hop distance, there are considered: elements where A is aggregated to, i.e., {B}; elements which are related to A with association relation, i.e., {C}; and elements whose parent is A, i.e., {F}. Therefore, the element set for relevant elements at 1-hop distance represents relevant elements at zero-hop distance for set {B, C, F}. Similarly, one can find element sets for A at a distance of any number of hops.

In accordance with at least one embodiment of the invention, and with continued reference to all FIGS. 1-3 simultaneously, the production environment (102) setup is captured in a test environment (106) by maintaining an identical metamodel in both environments 102/106. Then, a discovery tool is applied to generate a configuration model 110 of the test environment 106. The techniques presented herebelow convey how to enhance the test environment (106) configuration model.

In accordance with at least one embodiment of the invention, in a test mode, a single configuration change is introduced. This modifies some elements in the system, leading to changes in the attributes of the model elements. The model is rediscovered post-change, and the pre-change and post-change models are compared to identify which model elements are modified. Various events are also tracked, such as file system events and database events, that have been generated due to the configuration change. Ultimately, these events are associated to the modified model elements using the "Affects" relationship.

In accordance with at least one embodiment of the invention, with regard to an event filter, the administrator performs a single configuration change using a change configuration script in the test environment 106. An event trigger gathers all events from a number of files or database tables after a configuration change. The same change is applied multiple (N) times such that spurious events can be pruned. By way of an illustrative and non-restrictive example, a suitable choice of N is between 4 and 10. Each run generates a set of events in Si, where $0<i<(N+1)$. Si is composed of two sets Fa and Fo. Set Fa includes actual events which are responsible for a configuration change, that is, the events will always generate when this file gets affected. Set Fo includes other events which are not relevant to the change, such as events due generated due to OS (operating system) cron jobs or antivirus scans.

In accordance with at least one embodiment of the invention, primary events of Fa are isolated from set Si. Since an accurate isolation of primary events may be impossible, therefore, an algorithm outputs an ordered list of events. Primary events in Fa get the highest weight, followed by secondary events in Fa, while the events in Fo get the lowest weight.

Accordingly, in accordance with at least one embodiment of the invention, rules such as those that follow are used to assign the event weights. First, from each Si, events are pruned using the following policies. Configuration files are assumed to always be present before a configuration change, so that any change in configuration will result in a "modify", event rather than a "create" and "delete" event. Hence, "create" and "delete" events are ignored. Further, it is assumed that configuration data and application data will reside in different files. Hence, those files which produce events while running workload are ignored. Additionally, it is assumed that any hidden file does not hold configuration information. Hence, events from hidden files are ignored.

In accordance with at least one embodiment of the invention, after getting a new filtered event set Si, $0<i<n+1$, events are further analyzed in each Si to identify the primary events. Thus, the system will analyze the events across a set Si, $0<i<(N+1)$ and assign weights to them using steps as follows. Common files across all Si's are extracted, and unit weights are assigned to each of the common files. Weights of the common files are normalized by dividing with frequency of that file modification event. For example, if considering a file F present across all sets of size N that gets modified in every set, the normalized weight becomes F*unit weight/N across all Si's.

In accordance with at least one embodiment of the invention, if any two events get same weight then, as a "tiebreaker", use the timestamp of the file. If one event has a timestamp value larger than another event consistently in all Si's, then the weight of the event having the larger timestamp value is increased by one percent of its original weight. If this new weight goes below next lower weight assigned to any event in the list, then the original weight is decreased by half of the difference between the original weight and next lower weight.

Thereupon, in accordance with at least one embodiment of the invention, all weights are again normalized with respect to the highest weight obtained for a particular configuration change, and events having a lesser weight than a threshold value are ignored. This threshold value can be specific to each configuration change; by way of an illustrative and non-restrictive example, a threshold value between about 0.1 and about 0.4 can be used. Remaining events are sorted based on weight value, and the computed weight for each event becomes the "AffectWeight" as explained herein.

In accordance with at least one embodiment of the invention, in order to associate filtered events to the modified model elements, the modified model elements are first identified. As pre-change and post-change model graphs have an identical count of vertices and edges, they are always topologically isomorphic. However, when the vertex attributes and values are considered, then the topological isomorphism is broken. This is exemplified in FIG. 2, and may occur because completely identical elements in configuration model can be present at different locations when an ordered search, such breadth-first, is applied on the pre- and post-change model graphs. The reason behind this problem is that the discovery tool may not traverse the nodes in exact same order on each run, thereby generating the model graphs differently, although vertices and edges remain same. Therefore, when comparing the pre- and post-change models, it is desirable to correlate the elements in the two graphs first.

In accordance with at least one embodiment of the invention, in order to correlate the model elements, the NCA technique (as discussed herein) is employed. Accordingly, for every element in the pre-change graph, the candidate set to be searched is picked by selecting all elements belonging to the same type as that of the source element. Then, the NCA assists in determining the weight of the match. The highest match indicates the mapped element in the post-change graph. Once all the model elements are mapped, it is not difficult to determine the modified elements.

Next, in accordance with at least one embodiment of the invention, filtered events are associated to the affected model elements. An "Affects" relation is created from these events, to an affected element in the model, by assigning Affects-Weight as calculated in a filter step (as discussed herein). The impact of event to element is proportional to this weight, which will be employed in the Alert Generator. The affected attribute information is also stored; in other words, in the contex of affected events, those model element attributes which get affected will be stored in the database.

In accordance with at least one embodiment of the invention, in order to find affected model elements in applications, which are dependent on another application, the model entities which can be potentially affected are discovered. For example, in a setup, changing the DB port may entail a change in the application port. Given that the model element in the DB application has undergone a change, the corresponding entity in the app model is then found. The challenge again is that there can be multiple elements of the same affected type. The technique proceeds by applying a single change to the system in test environment 106, and using the discovery tool to generate the pre-change and post-change models. Elements that are modified in the post-change model are identified using the technique outlined immediately hereinabove. Now, in the pre-change model, values of the attributes for the modified element are picked, and the entire pre-graph where this value has appeared is searched. The latter set (i.e., where all the model elements having attribute values similar to the affected model element attribute value) represents the candidate set for the SameAs relationship. A particular weight, SameAsWeight, is then assigned to distinguish the strength of the SameAs relationship.

Accordingly, in accordance with at least one embodiment of the invention, SameAsWeight is computed by measuring the closeness of related neighbors for both elements, and the weights are finally normalized with respect to the highest weight. The greater the weight, the higher the probability of a model element affecting another model element. The weight computation again leverages the NCA technique of looking through k-hop neighbors, where k starts from 0. If there is no attribute with common values, then the weight is zero. Otherwise, the weight is number of attributes with an identical value. As such, at any k-hop, all the k-hop neighbors from the UML model graph (refer to the discussion of UML models hereinabove) is considered, and an aggregate of all the attributes is taken into consideration while comparing the values. Finally, the weights from each hop are aggregated, and divided by the hop-count, in order to reduce relative importance as hops are traversed. The algorithm stops when the weight remains the same when the next hop is added, or when there is an overlapping node as there is spreading out from the source and matching node. Table 1 in the Appendix presents the pseudo-code for the algorithm.

In accordance with at least one embodiment of the invention, once the configuration model in the test environment (106) is enhanced, this information is exported to the meta-model. As such, there are three entities to then be added to the meta-model: Events, Affects and SameAs relationships. For Events, all events from the model are added to the meta-model. For the Affects relationship, the AffectsWeight and modified attributes associated with the edge are added into the meta-model. Finally, for the SameAs relationship, only the edge is included in the meta-model. The SameAsWeight computed earlier will be used later.

In accordance with at least one embodiment of the invention, given the enhanced meta-model for the test environment 106, the next task is to apply this knowledge to enhance the production model (or model of production environment 102). Due to the scale difference between the meta-model and production model, for each Affects relation in the meta-model, there will be multiple Affects relations in the production model. The source element for Affects relations is represented by events and the destination element is represented by model elements. Therefore, the first task is to find all events and model elements for any Affects relation in the meta-model, and the next task is to determine which event should have an Affects relation with which model element. Another key task lies in transferring SameAs relationship knowledge from the meta-model to the model of the production environment 102.

In accordance with at least one embodiment of the invention, for adding events, a file event in meta-model represents a file path that was learned in the test environment 106. For each file event in the meta-model, a candidate set of files in the production environment 102 is then found by way of the following method. Consider that the file path in the enhanced meta-model is /dir1/dir2/dir3/dir4/file1 (learned in the test environment 106). All files in the production environment 102 in pre-specified product install-root directories (where products are installed) with the name file1 are then found. Since both the production environment 102 and test environment 106 are deployed from the same virtual appliance, the corresponding file path in production environment 102 should then be /dir1p/dir2p/dir3p/dir4p/file1 (the depth of the file path will be the same in both environments). As environment variables, e.g. hostname, will be different from test environment 106 to production environment 102, there may be a change in directory name, depending on the hostname. Files with a file path depth different from that in the meta-model file path are rejected. Directory names at each depth in both paths are compared, and the match count is increased by one if they are equal. All such files are sorted based on total match count, and this match count is normalized for each file path thus obtained, by the maximum match count obtained in the same context. This match count is then considered to be pathMatchWeight (w2).

For adding Affects relations, in accordance with at least one embodiment of the invention, for each Affects relationship in the meta-model, there are found the file event, affected model element type and affected attribute of this model element. There are then identified model elements and attributes in the production environment (102) model with a type as identified in the, meta-model and there is then found a candidate set of files in the production environment 102 in a manner described herein. There can be more than one candidate model element and more than one candidate file event for the Affects relation. The NCA is applied for each candidate model element and candidate file path combination; there will be a match if an attribute value is a substring of a candidate file path. Finally, the weight of all files is normalized by the maximum weight obtained. This weight (normalized weight of each file) is considered to be eventAffinityModelWeight (w3). At this point, three weights, namely, AffectsWeight (w1), pathMatchWeight(w2), and eventAffinityModelWeight(w3) are combined to generate a compound weight for each element in candidate set. The function to combine the weights is as follows: W1*W2*W3/max(W2)*max(W3), where max(W2) and max(W3) are the highest weights among the respective candidate sets. An Affects relationship is created from this file with respect to elements with the compound weight. There may be some false file events that are added by the foregoing process (with lower weights), whose modify event will not result in a change of configuration. A method for eliminating false dependencies of events, as explained herein, prunes events gradually at run-time as new changes are executed.

In accordance with at least one embodiment of the invention, for each SameAs relation in meta-model there are identified the types of elements on both side of relations and SameAs is added along with attributes on both sides responsible for the SameAs relation. In the configuration model, for each pair of those model elements, a check is made for corresponding attribute values. If they are same, then this relation is added similarly to the meta-model, and the weight is calculated using the NCA. (See, particularly, the Calculate Weight method in Table 1.)

In accordance with at least one embodiment of the invention, the enhanced production model is employed for better configuration management, and the model is further refined by observing runtime behavior. The runtime phase, in particular, is that phase in which the user 112 is using the enterprise system, and change event triggers that were learnt in the last phase are triggered. If any configuration is changed by user 112, events are obtained via running the enterprise system in the context of event triggers. These events are processed with the help of the extended configuration model and model analyzer. Particularly, the model analyzer analyzes the complete model after getting a configuration change trigger, to decide as to any and all necessary configuration change propagation alerts. The "alert" filter filters any unnecessary alert and sorts the remaining alerts in terms of risk or possibility of configuration error.

In accordance with at least one embodiment of the invention, the enterprise system is activated with change event triggers that were learned in the learning phase. The overhead due to these event triggers is very small. The event triggers represent threads which essentially are normally "sleeping", but when a "change event" occurs, the configuration file changes.

In accordance with at least one embodiment of the invention, when the user 112 changes any configuration, the system receives events from the Event trigger. As such, all events are collected in a pre-defined time window. These events are searched for in the model, along with the Affects relations from these events, to know what elements in model have been affected. Then, SameAs relations in the model are followed from affected elements, to determine other elements that may be affected. At the same time, there is also rediscoverey of the part of the system which corresponds to the partial model that is affected from these events. Thereupon, a check is made as to whether the SameAs relation still holds or not, if any such relation exists in the affected elements. If it does not hold, then alerts are generated for those elements where the user 112 would need to propagate a configuration change.

In accordance with at least one embodiment of the invention, for each alert that was obtained in the model analyzer from the extended model, two weights are associated with this alert. The first weight is associated in reference from an event to an affected element, to represent a measure of the effectiveness of this event in affecting the element. The second weight is associated in reference from the affected element to another element with which it is related in a "SameAs" relation. Both alerts (i.e., the two weights just mentioned) are added to determine a find a cumulative weight. Finally, the alerts are sorted in descending order of the weights.

In accordance with at least one embodiment of the invention, a model refinement process eliminates false dependencies of events from the model. Event Trigger aggregates all events happened during a fixed time window, then events generated by modifying the same source more than once during the same time window are ignored. Further, Event Trigger analyzes whether any one of the events does not change attribute values of the affected model elements. If any one of the events does not so affect, the association of the event to the "Affects" relation of that model element is removed. By applying this method for events generating exactly one modify trigger, the "Affects" relationship from true file events will never be removed.

Figure 4:
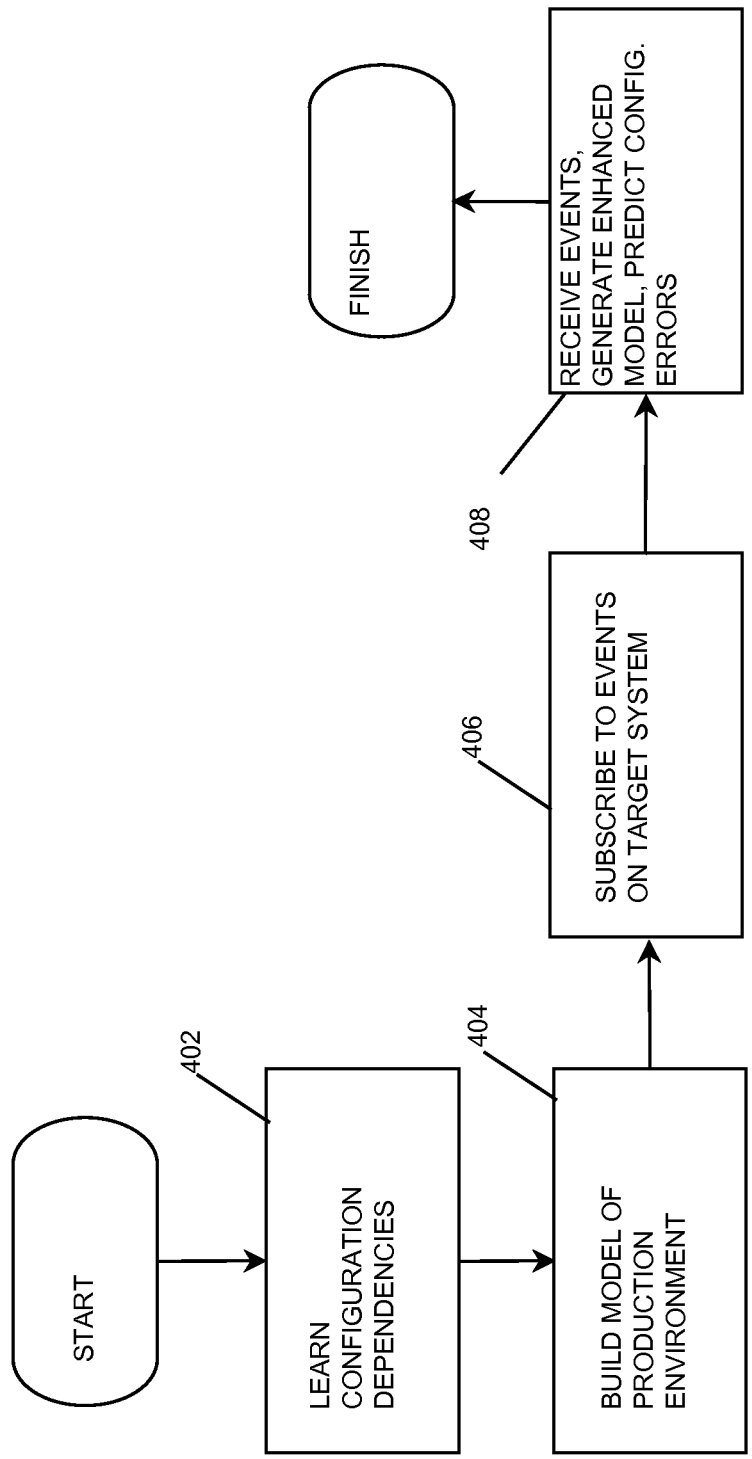
FIG. 4 sets forth a process more generally for tracking changes in an information technology environment.

FIG. 4 sets forth a process more generally for tracking changes in an information technology environment, in accordance with at least one embodiment of the invention. It should be appreciated that a process such as that broadly illustrated in FIG. 4 can be carried out on essentially any suitable computer system or set of computer systems, which may, by way of an illustrative and on-restrictive example, include a system such as that indicated at 12' in FIG. 5. In accordance with an example embodiment, most if not all of the process steps discussed with respect to FIG. 4 can be performed by way a processing unit or units and system memory such as those indicated, respectively, at 16' and 28' in FIG. 5.

As shown in FIG. 4, configuration dependencies are learned in a production environment (402), and a model of the production environment is built (404). Events on a target system in the production environment are subscribed to (406). Events are received and correlated with the model to generate an enhanced model, and the enhanced model is thereupon employed to predict configuration errors (408).

Figure 5:
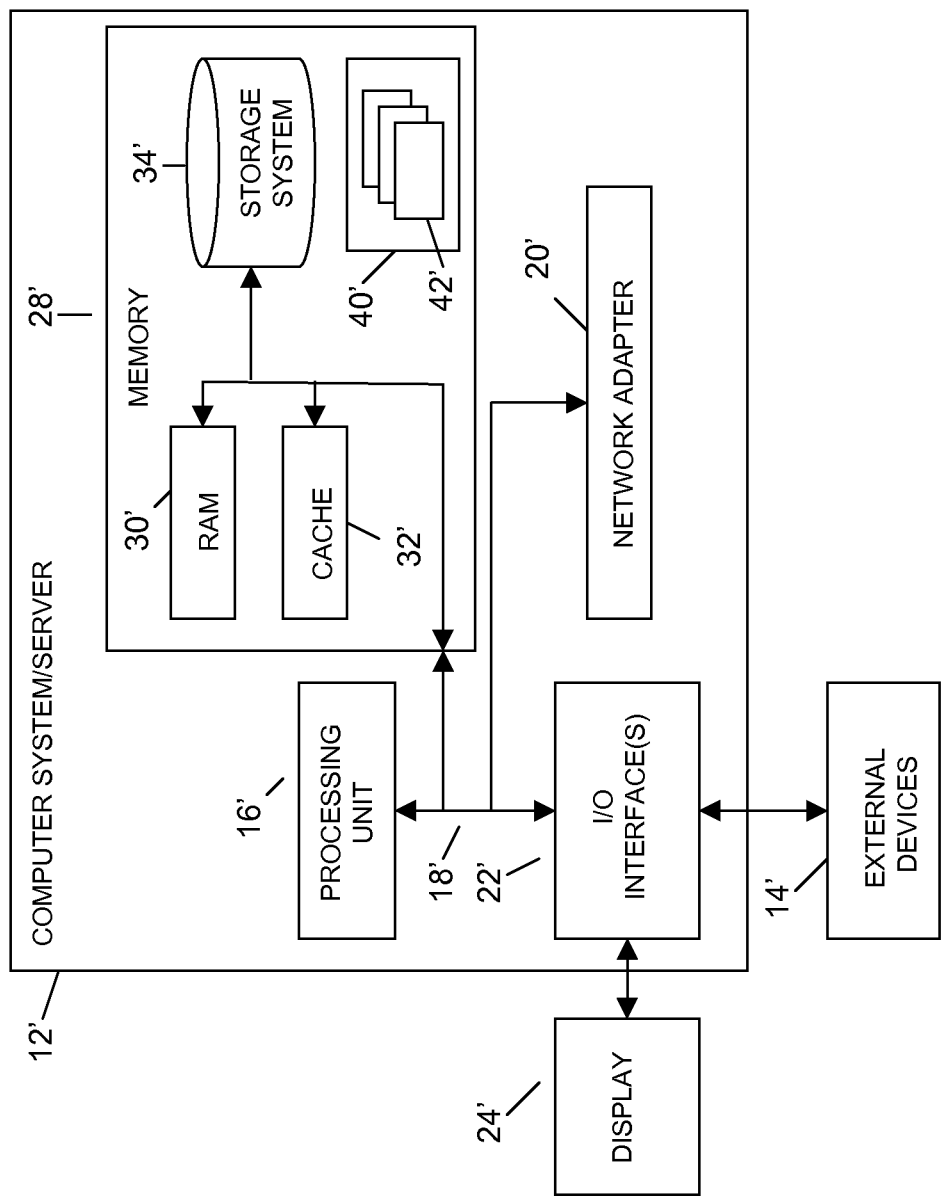
FIG. 5 illustrates a computer system.

Referring now to FIG. 5, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that is accessible by computer system/server 12', and it includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' by way of example, and not limitation, as well as an operating system, at least one application program, other program modules, and program data. Each of the operating system, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enable a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'.

It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

TABLE 1

APPENDIX

```
Input: ModelElement, ModelAttribute
Output: Create SameAs relation among ModelElement
Procedure: EnhanceModel(ModelElement element1, ModelAttribute attribute1)
  1: var1=attribute1.getValue( )
  2: modelelements=getModelElements(Model m)
  3: for all element2 in modelelements do
  4:          if element2 != element1 then
  5:               attributes=getAllAttributes(element2);
  6:          for all attribute2 in attributes do
  7:               var2=attribute2.getValue( );
  8:               if var2 = var1 then
  9:                    neighbourset1=getZeroHopElements(element1);
 10:                    neighbourset2=getZeroHopElements(element2);
 11:                         distance=-1;
 12:                         weight=0;
 13:                         SameAsWeight=calculateWeight(neighbourset1,neighbourset2,weight,distance);
 14:                         createSameAsRelation(element1,element2,SameAsWeight);
 15:                         Continue;
 16:                    end if
 17:               end for
 18:          end if
 19: end for
Input: ModelElementSet, ModelElementSet, float, int
Output: return SameAsWeight
Procedure: calculateWeight(ModelElementSet neighbourset1, ModelElementSet neighbourset2, float weight, int
distance)
  1: Weight=weight
  2: if distance=-1 then
  3:       Weight =getWeight(neighbourset1, neighbourset2)
  4:       distance=distance+1
  5:       calculateWeight(neighbourset1, neighbourset2, Weight, distance)
  6: end if
  7: ModelElementSet surrondingSet1=getUnitHopElements(neighbourset1)
  8: ModelElementSet surrondingSet2=getUnitHopElements(neighbourset2)
  9: ModelElementSet neighbourset1 = neighbourset1 ∪ surrondingSet1
 10: ModelElementSet neighbourset2 = neighbourset2 ∪ surrondingSet2
 11: if isOverlap(neighbourset1, neighbourset2) then
 12:       return Weight
 13: end if
 14: temp = getWeight(surrondingSet1, surrondingSet2)
 15: temp = temp + getWeight(surrondingSet1, neighbourset2)
 16: temp = temp + getWeight(neighbourset1, surrondingSet2)
 17: if temp = 0 then
 18:       return Weight
 19: else
```

TABLE 1-continued

APPENDIX

20: distance=distance+1
21: Weight=Weight+temp/distance
22: calculateWeight(neighbourset1,neighbourset2, Weight, distance)
23: end if

What is claimed is:

1. A method comprising:
utilizing at least one processor to execute computer code configured to perform the steps of:
learning configuration dependencies in a production environment;
building an initial model of the production environment;
subscribing to events that are generated on a target system in the production environment; and
receiving events and correlating the events with the initial model to generate an enhanced model, and thereupon employing the enhanced model to predict configuration errors via processing the events and, as the events are processed, alerting proactively as to a probable configuration error;
wherein generating an enhanced model comprises:
tagging portions of the initial model with received events; and
searching connected elements for candidate nodes from two graphs containing elements of the initial model, and assigning a weight to mark a degree of match between a source vertex and a chosen vertex of a set comprising the candidate nodes from the two graphs.

2. The method according to claim 1, wherein the production environment comprises a multi-tier production environment.

3. The method according to claim 2, wherein said building comprises ascertaining relationships between different tiers in the multi-tier production environment.

4. The method according to claim 3, wherein said ascertaining comprises ascertaining an effect on one tier of a change in another tier.

5. The method according to claim 1, wherein said correlating comprises comparing the initial model with a refreshed model.

6. The method according to claim 1, wherein said learning comprises determining configuration dependencies between elements of the initial model.

7. The method according to claim 6, wherein said determining comprises analyzing the enhanced model to generate an overview of configuration dependencies between elements of the initial model.

8. The method according to claim 7, wherein said determining comprises employing value-based matching in a neighborhood of an element of the initial model.

9. The method according to claim 8, wherein said determining further comprises generating a meta-model of configuration dependencies.

10. The method according to claim 9, wherein said generating of a meta-model comprises designating the configuration dependencies with predetermined relation types.

11. The method according to claim 1, wherein said employing of the enhanced model to process the events in realtime comprises:
subscribing to events;
receiving events; and
employing the enhanced model to generate alerts on potential configuration errors.

12. An apparatus comprising:
at least one processor; and
a computer readable storage medium having computer readable program code embodied therewith and executable by the at least one processor, the computer readable program code comprising:
computer readable program code configured to learn configuration dependencies in a production environment;
computer readable program code configured to build all an initial model of the production environment;
computer readable program code configured to subscribe to events that are generated on a target system in the production environment; and
computer readable program code configured to receive events and correlate the events with the initial model to generate an enhanced model, and thereupon employ the enhanced model to predict configuration errors via processing the events and, as the events are processed, alerting proactively as to a probable configuration error;
wherein generating an enhanced model comprises tagging portions of the initial model with received events; and
searching connected elements for candidate nodes from two graphs containing elements of the initial model, and assigning a weight to mark a degree of match between a source vertex and a chosen vertex of a set comprising the candidate nodes from the two graphs.

13. A computer program product comprising:
a non-transitory computer readable storage medium having computer readable program code embodied therewith, the computer readable program code comprising:
computer readable program code configured to learn configuration dependencies in a production environment;
computer readable program code configured to build an initial model of the production environment;
computer readable program code configured to subscribe to events that are generated on a target system in the production environment; and
computer readable program code configured to receive events and correlate the events with the initial model to generate an enhanced model, and thereupon employ the enhanced model to predict configuration errors via processing the events and, as the events are processed, alerting proactively as to a probable configuration error;
wherein generating an enhanced model comprises tagging portions of the initial model with received events; and
searching connected elements for candidate nodes from two graphs containing elements of the initial model, and assigning a weight to mark a degree of match between a source vertex and a chosen vertex of a set comprising the candidate nodes from the two graphs.

14. The computer program product according to claim 13, wherein the production environment comprises a multi-tier production environment.

15. The computer program product according to claim 14, wherein said computer readable program code is configured to ascertain relationships between different tiers in the multi-tier production environment.

16. The computer program product according to claim 15, wherein said computer readable program code is configured to ascertain an effect on one tier of a change in another tier.

17. The computer program product according to claim 16, wherein said computer readable program code is configured to correlate via comparing the initial model with a refreshed model.

18. The computer program product according to claim 17, wherein said computer readable program code is configured to determine configuration dependencies between elements of the initial model.

19. The computer program product according to claim 18, wherein said computer readable program code is configured to analyze the enhanced model to generate an overview of configuration dependencies between elements of the initial model.

20. The computer program product according to claim 19, wherein said computer readable program code is configured to employ value-based matching in a neighborhood of an element of the initial model.

21. The computer program product according to claim 20, wherein said computer readable program code is configured to generate a meta-model of configuration dependencies.

22. The computer program product according to claim 21, wherein said computer readable program code is configured to generate a meta-model via designating the configuration dependencies with predetermined relation types.

23. The computer program product according to claim 13, wherein said computer readable program code is configured to:
    subscribe to events;
    receive events; and
    employ the enhanced model to generate alerts on potential configuration errors.

24. The method according to claim 1, wherein said tagging comprises tracking a change in the initial model in response to receiving an event.

25. The method according to claim 1, wherein said alerting comprises sending an update to a central database.

* * * * *